United States Patent
Masui

(10) Patent No.: US 6,687,206 B1
(45) Date of Patent: Feb. 3, 2004

(54) INFORMATION RECORDING METHOD AND APPARATUS

(75) Inventor: Naruhiro Masui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 639 days.

(21) Appl. No.: 09/584,693

(22) Filed: Jun. 1, 2000

(30) Foreign Application Priority Data

Jun. 2, 1999 (JP) ............................................ 11-155711
Dec. 28, 1999 (JP) ........................................... 11-373116

(51) Int. Cl.$^7$ ................................................. G11B 5/09
(52) U.S. Cl. ................................................... 369/47.19
(58) Field of Search ........................... 369/44.35, 44.41, 369/44.29, 44.38, 47.19, 59.12, 275.3, 44.13, 47.28, 59.13

(56) References Cited

U.S. PATENT DOCUMENTS

| | | | |
|---|---|---|---|
| 4,901,300 A | * | 2/1990 | Van Der Zande et al. .  369/47.4 |
| 6,262,950 B1 | * | 7/2001 | Narahara et al. ..........  369/30.1 |
| 6,469,961 B2 | * | 10/2002 | Akiyama et al. ........  369/44.13 |
| 6,549,495 B1 | * | 4/2003 | Spruit et al. .............  369/47.19 |

FOREIGN PATENT DOCUMENTS

| | | |
|---|---|---|
| JP | 9-326138 | 12/1997 |
| JP | 10-283638 | 10/1998 |

* cited by examiner

*Primary Examiner*—William Korzuch
*Assistant Examiner*—Kimlien Le
(74) *Attorney, Agent, or Firm*—Dickstein Shapiro Morin & Oshinsky LLP

(57) ABSTRACT

In an information recording method and apparatus, a sequence of sync frames indicative of data is recorded onto tracks of an optical recording medium. In the recording medium, prepits are formed on lands between the tracks at given intervals, and sync patterns, providing synchronization on a sync-frame basis, are inserted in the sync frames such that each sync pattern has a length in a track direction larger than a length of one of the prepits and a position of each sync pattern matches with a position of at least one of the prepits. Codes that represent sync patterns for the sync frames are selected such that each sync pattern is formed as a space on the recording medium. Modulation codes are generated based on the sync frames in which the selected codes are inserted, by modulating the sync frames containing the selected codes in accordance with a predetermined modulation scheme. A sequence of recording pulses is generated by converting the modulation codes through a predetermined conversion scheme. A prepit position signal is detected from one of the prepits for each of the sync frames during the writing of the recording pulses to the recording medium, so that a write position control is performed based the detected prepit position signal. Further disclosed in an optical recording medium which is appropriate for use with the information recording method and apparatus.

13 Claims, 6 Drawing Sheets

INFORMATION RECORDING METHOD AND APPARATUS

BACKGROUND OF THE INVENTION

1. Field of The Invention

The present invention relates to an information recording method and apparatus which carry out a write position control based on a prepit position signal detected during the writing of information to a recording medium, such as a DVD-R, in which prepits, indicative of address information, are formed on the lands between the tracks at given intervals.

2. Description of The Related Art

Recently, write-once or rewritable optical recording media, such as CD-R/RW, and disk drives of such media are put into practical use. These recording media and disk drives are increasingly applied to various kinds of write-once or rewritable applications.

When data is written or rewritten to the optical recording medium of the above type, it is important that an information recording apparatus provides accurate write position control during the writing. If the write position control performed during the writing is inaccurate, there is a possibility that new data to be written to the recording medium and the old data already recorded therein overlap each other. In such a case, the old data or the new data will be destroyed or lost.

In order to provide a write position control, a conventional information recording apparatus uses a linking region placed between an old data area and a new data area of the recording medium. The linking region has a predetermined length. For example, dummy data or control bits are written to the linking region, and then the new data is written to the new data area following the end of the linking region.

According to the conventional method described above, new data cannot be written to the linking regions in the recording medium. Hence, there is a problem in that the storage capacity of the recording medium available for recording information is reduced due to the use of the linking regions. It is desirable to provide an information recording apparatus and method which can carry out accurate write position control during the writing. If accurate write position control is carried out with the information recording apparatus and method, the linking regions where the unnecessary data are recorded can be eliminated or minimized. This will be helpful to increase the storage capacity of the recording medium available for recording information.

As disclosed in Japanese Laid-Open Patent Application No. 9-326138, there is a known apparatus which detects address information and rotation control information of an optical recording medium when recording a signal onto the recording medium. In the recording medium, wobbling grooves, indicative of rotation control information, are formed as the tracks in which information is recorded, and pits, indicative of address information, are formed on the lands between the wobbling grooves at given intervals. The rotation control information is obtained by detecting a wobble signal from the wobbling grooves, and the address information is obtained by detecting a pit signal from the pits. Even when a track pitch of the recording medium is narrow, the information recording apparatus can provide accurate address information and rotation control information, so as to allow high-density recording of the recording medium.

It is possible for the above-mentioned recording apparatus to accurately obtain the address information and the rotation control information from the recording medium even when the track pitch is narrow. However, the address pits indicative of the address information are formed on the lands, not on the tracks (the wobbling grooves) of the recording medium. In other words, the above-mentioned recording apparatus does not place the address information at the start position of one sector along the track of the recording medium. According to the information recording method of this type, the data pits, formed along the tracks, are not interrupted by the address pits, which will provide good compatibility to read-only recording media.

However, if the track pitch of the medium provided by the above-mentioned recording apparatus is narrowed considerably for high-density recording, the influence of crosstalk due to reflection beams from the neighboring grooves of the land radiated by a light beam will not be negligible. When the crosstalk occurs, the wobble signal detected from the recording medium will significantly vary in amplitude or in phase.

In a case in which a write position control is performed with the above-mentioned recording apparatus by using the wobble signal, the occurrence of a phase error of the wobble signal is inevitable, and the above-mentioned recording apparatus is not appropriate for providing accurate write position control.

In the above-mentioned recording apparatus, the address pits indicative of the address information are formed on the lands, not on the tracks of the recording medium. The prepit signal detected from the recording medium is not significantly influenced by the crosstalk and will not vary in amplitude or phase. In a case in which a write position control is performed with the above-mentioned recording apparatus by using the prepit signal, a phase error of the prepit signal is negligible, and the above-mentioned recording apparatus is appropriate for providing accurate write position control.

Generally, however, a laser power of a laser light source used to form a mark (also called a pit) on the recording medium is different from a laser power of the laser light source used to form a space (also called a non-pitted area or a land). It is difficult for the above-mentioned recording apparatus to accurately detect the prepit signal for both the laser powers during the writing to the recording medium, for the purpose of the write position control. The problem of errors in the detection of the prepit position is inevitable, and the above-mentioned recording apparatus is not appropriate for providing accurate write position control.

Further, Japanese Laid-Open Patent Application No. 10-283638 discloses a prepit detection unit of an information recording apparatus. The prepit detection unit disclosed in the above publication is adapted to allow accurate detection of prepits of an optical recording medium by radiating at least two laser beams having different laser powers to the recording medium. The prepit detection unit is directed to eliminating the above-mentioned problem.

The above-mentioned prepit detection unit includes a first prepit detecting circuit that detects a first prepit signal from the recording medium by radiating a first laser beam having a high-intensity laser power used to form a mark, and a second prepit detecting circuit that detects a second prepit signal from the recording medium by radiating a second laser beam having a low-intensity laser power used to form a space. By calculating a logical sum of the detected prepit signals at the first and second prepit detecting circuits, the above prepit detection unit outputs a prepit signal based on the calculated sum.

The above-mentioned prepit detection unit can output the prepit signal for both the first and second laser beams with little prepit position error when the prepit signal is detected from the recording medium during the writing. However, the prepit signal is obtained from the calculated sum of the detection results of the first and second prepit detecting circuits, and it is difficult for the above-mentioned prepit detection unit to obtain a level of accuracy of the detection of the prepit signal that is appropriate for providing accurate detection of the prepit positions for the write position control.

Further, a multipulse recording method which forms a single mark on the recording medium by using a recording waveform having multiple recording pulses is often used for large-quantity information recording. For example, the multipulse recording method is used for the recording of a DVD-R.

However, in the multipulse recording method, the pulse width of the respective recording pulses in the recording waveform is small and the operating state of the laser light source must be frequently changed from ON state to OFF state or vice versa during a short period of time. It is difficult for the multipulse recording method to accurately detect the prepit signal during the writing, for the purpose of the write position control. In the case of the multipulse recording method, the problem of errors in the detection of the prepit positions is inevitable.

Further, in the multipulse recording method, when the prepit signal is detected from the recorded areas of the recording medium, the amplitude of the prepit signal detected is greatly varied because the reflectance of a mark on the medium and the reflectance of a space on the medium are different from each other. With a certain relationship between the prepit position and the mark position, an error in the detected prepit position may take place.

Accordingly, not only when the prepit signal is detected during the writing, but also when the prepit signal is detected from the recorded areas of the recording medium, it is difficult for the conventional information recording methods and devices to obtain a level of accuracy of the detection of the prepit signal that is appropriate for providing accurate detection of the prepit positions for the write position control. In the worst case, the detection of the prepit signal is impossible or errors in the detection of the prepit positions may take place.

SUMMARY OF THE INVENTION

In order to overcome the above-described problems, preferred embodiments of the present invention provide an improved information recording apparatus and method which can detect a prepit position signal with high accuracy, from the recording medium during the writing or when the prepit position signal is detected from the recorded areas of the recording medium, so that accurate write position control is carried out based on the detected prepit position signal.

According to one preferred embodiment of the present invention, an information recording method information recording method for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, includes the steps of: selecting codes that represent sync patterns for the sync frames such that each sync pattern is formed as a space on the recording medium; generating modulation codes based on the sync frames in which the selected codes are inserted, by modulating the sync frames containing the selected codes in accordance with a predetermined modulation scheme; generating a sequence of recording pulses by converting the modulation codes through a predetermined conversion scheme; and detecting a prepit position signal from one of the prepits for each of the sync frames during the writing of the recording pulses to the recording medium, so that a write position control is performed based the detected prepit position signal.

According to another preferred embodiment of the present invention, an information recording method for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, includes the steps of: selecting codes that represent first sync patterns for a portion of the sync frames such that each first sync pattern is formed as a space on the recording medium, and selecting codes that represent second sync patterns for the remainder of the sync frames such that each second sync pattern is formed on the recording medium so as to meet a low-frequency reduction scheme; generating modulation codes based on the sync frames in which the selected codes are inserted, by modulating the sync frames containing the selected codes in accordance with a predetermined modulation scheme; generating a sequence of recording pulses by converting the modulation codes through a predetermined conversion scheme; and detecting a prepit position signal from one of the prepits for each of the sync frames during the writing of the recording pulses to the recording medium, so that a write position control is performed based the detected prepit position signal.

According to another preferred embodiment of the present invention, an information recording method for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, includes the steps of: providing the prepits which are formed on the lands of the recording medium at intervals that are equal to an integral multiple of a unit length corresponding to a channel bit; selecting codes that represent first sync patterns for a portion of the sync frames such that each of the first sync patterns is formed as a space on the recording medium, when positions of the first sync patterns match with positions of the prepits, and selecting codes that represent second sync patterns for the remainder of the sync frames such that each of the second sync pattern is formed on the recording medium so as to meet a low-frequency reduction scheme, when positions of the second sync patterns do not match with the positions of the prepits; generating modulation codes based on the sync frames in which the selected codes are inserted, by modulating the sync frames containing the selected codes in accordance with a predetermined modulation scheme; generating a sequence of recording pulses by converting the modulation codes through a predetermined conversion scheme; and detecting a prepit position signal from one of the prepits for each of the sync frames during the writing of the recording pulses to the recording medium, so that a write position control is performed based the detected prepit position signal.

According to another preferred embodiment of the present invention, an information recording method for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, includes the steps of: selecting codes that represent first sync patterns for a portion of the sync frames such that each of the first sync patterns is formed as a space, when the number of the first sync patterns being successively formed as a mark, positions of the first sync patterns matching with positions of the prepits, is larger than a predetermined number, and otherwise selecting codes that represent second sync patterns for the remainder of the sync frames such that each of the second sync pattern is formed so as to meet a low-frequency reduction scheme; generating modulation codes based on the sync frames in which the selected codes are inserted, by modulating the sync frames containing the selected codes in accordance with a predetermined modulation scheme; generating a sequence of recording pulses by converting the modulation codes through a predetermined conversion scheme; and detecting a prepit position signal from one of the prepits for each of the sync frames during the writing of the recording pulses to the recording medium, so that a write position control is performed based the detected prepit position signal.

According to another preferred embodiment of the present invention, an information recording apparatus for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, includes: sync information generating means for selecting codes that represent sync patterns for the sync frames such that each sync pattern is formed as a space on the recording medium; prepit position signal detecting means for detecting a prepit position signal from one of the prepits for each of the sync frames during the writing of the recording pulses to the recording medium; write position signal generating means for generating a write-position start signal based on the prepit position signal detected by the prepit position signal detecting means; and data encoding means for generating modulation codes based on the sync frames in which the codes selected by the sync information generating means are inserted, by modulating the sync frames containing the selected codes in accordance with a predetermined modulation scheme, the data encoding means generating a sequence of recording pulses by converting the modulation codes through a predetermined conversion scheme, and the data encoding means starting outputting the sequence of recording pulses in accordance with the write-position start signal supplied by the write position signal generating means.

According to another preferred embodiment of the present invention, an information recording apparatus for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, includes: sync information generating means for selecting codes that represent first sync patterns for a portion of the sync frames such that each first sync pattern is formed as a space on the recording medium, and selecting codes that represent second sync patterns for the remainder of the sync frames such that each second sync pattern is formed on the recording medium so as to meet a low-frequency reduction scheme; prepit position signal detecting means for detecting a prepit position signal from one of the prepits for each of the sync frames during the writing of the recording pulses to the recording medium; write position signal generating means for generating a write-position start signal based on the prepit position signal detected by the prepit position signal detecting means; and data encoding means for generating modulation codes based on the sync frames in which the codes selected by the sync information generating means are inserted, by modulating the sync frames containing the selected codes in accordance with a predetermined modulation scheme, the data encoding means generating a sequence of recording pulses by converting the modulation codes through a predetermined conversion scheme, and the data encoding means starting outputting the sequence of recording pulses in accordance with the write-position start signal supplied by the write position signal generating means.

According to another preferred embodiment of the present invention, an information recording apparatus for recording a sequence of sync frames, indicative of data, onto tracks of an optical recording medium in which prepits are formed on lands between the tracks at intervals that are equal to an integral multiple of a unit length corresponding to a channel bit, and in which sync patterns, providing synchronization on a sync-frame basis, are inserted in the sync frames such that each sync pattern has a length in a track direction larger than a length of one of the prepits and a position of each sync pattern matches with a position of at least one of the prepits, includes: sync information generating means for selecting codes that represent first sync patterns for a portion of the sync frames such that each of the first sync patterns is formed as a space on the recording medium, when positions of the first sync patterns match with positions of the prepits, and for selecting codes that represent second sync patterns for the remainder of the sync frames such that each of the second sync pattern is formed on the recording medium so as to meet a low-frequency reduction scheme, when positions of the second sync patterns do not match with the positions of the prepits; prepit position signal detecting means for detecting a prepit position signal from one of the prepits for each of the sync frames during the writing of the recording pulses to the recording medium; write position signal generating means for generating a write-position start signal based on the prepit position signal detected by the prepit position signal detecting means; and data encoding means for generating modulation codes based on the sync frames in which the codes selected by the sync information generating means are inserted, by modulating the sync frames containing the selected codes in accordance with a predetermined modulation scheme, the data encoding means generating a sequence of recording pulses by converting the modulation codes through a predetermined conversion scheme, and the data encoding means starting outputting the sequence of recording pulses in accordance with the write-position start signal supplied by the write position signal generating means.

According to another preferred embodiment of the present invention, an information recording apparatus for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, includes: sync information generating means for selecting codes that represent first sync patterns for a portion of the sync frames such that each of the first sync patterns is formed as a space, when the number of the first sync patterns being successively formed as a mark, positions of the first sync patterns matching with positions of the prepits, is larger than a predetermined number, and otherwise for selecting codes that represent second sync patterns for the remainder of the sync frames such that each of the second sync pattern is formed so as to meet a low-frequency reduction scheme; prepit position signal detecting means for detecting a prepit position signal from one of the prepits for each of the sync frames during the writing of the recording pulses to the recording medium; write position signal generating means for generating a write-position start signal based on the prepit position signal detected by the prepit position signal detecting means; and data encoding means for generating modulation codes based on the sync frames in which the codes selected by the sync information generating means are inserted, by modulating the sync frames containing the selected codes in accordance with a predetermined modulation scheme, the data encoding means generating a sequence of recording pulses by converting the modulation codes through a predetermined conversion scheme, and the data encoding means starting outputting the sequence of recording pulses in accordance with the write-position start signal supplied by the write position signal generating means.

In the information recording method and apparatus of the present invention, codes that represent sync patterns for the sync frames are selected such that each sync pattern is formed as a space on the recording medium. Modulation codes are generated based on the sync frames in which the selected codes are inserted, by modulating the sync frames containing the selected codes in accordance with a predetermined modulation scheme. A sequence of recording pulses is generated by converting the modulation codes through a predetermined conversion scheme. A prepit position signal is detected from a sync prepit of the prepits for one of the sync frames during the writing of the recording pulses to the recording medium, so that a write position control is performed based the detected prepit position signal.

The information recording method and apparatus of the present invention are effective in detecting a prepit position signal with high accuracy, from the recording medium during the writing or when the prepit position signal is detected from the recorded areas of the recording medium. The information recording method and apparatus of the present invention can carry out accurate write position control based on the detected prepit position signal.

Further, according to another preferred embodiment of the present invention, an information recording apparatus for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, includes: first sync information generating means for generating first codes that represent first sync patterns for a portion of the sync frames such that each first sync pattern is formed as a space on the recording medium; second sync information generating means for generating second codes that represent second sync patterns for the remainder of the sync frames such that each second sync pattern is formed on the recording medium so as to meet a low-frequency reduction scheme; sync information selecting means for selecting one of the first codes generated by the first sync information generating means and the second codes generated by the second sync information generating means; prepit position signal detecting means for detecting a prepit position signal from one of the prepits for each of the sync frames during the writing of the recording pulses to the recording medium; write position signal generating means for generating a write-position start signal based on the prepit position signal detected by the prepit position signal detecting means; and data encoding means for generating modulation codes based on the sync frames in which the codes selected by the sync information selecting means are inserted, by modulating the sync frames containing the selected codes in accordance with a predetermined modulation scheme, the data encoding means generating a sequence of recording pulses by converting the modulation codes through a predetermined conversion scheme, and the data encoding means starting outputting the sequence of recording pulses in accordance with the write-position start signal supplied by the write position signal generating means.

According to another preferred embodiment of the present invention, an optical recording medium for use in an information recording apparatus which records a sequence of sync frames, indicative of data, onto tracks of the recording medium, includes: prepits provided on lands between the tracks at given intervals, the prepits being indicative of address information; and sync patterns provided in at least a portion of the sequence of sync frames, the sync patterns providing synchronization on a sync-frame basis, such that each sync pattern has a length in a track direction larger than a length of one of the prepits and a position of each sync pattern matches with a position of at least one of the prepits.

The information recording apparatus and medium of the present invention are more effective in detecting a prepit position signal with high accuracy, from the recording medium during the writing or when the prepit position signal is detected from the recorded areas of the recording medium. The information recording apparatus and medium of the present invention are useful and effective in carrying out accurate write position control based on the detected prepit position signal.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

First, a recording medium which is appropriate for use in the information recording method and apparatus of the preferred embodiments of the invention will be explained. In the recording medium, prepits, indicative of address information, are formed on the lands between the tracks at given intervals. For the sake of convenience, in the following description, a DVD-R is taken as one example of the above recording medium.

In the DVD-R, wobbling grooves, indicative of rotation control information, are formed as the tracks where information is recorded, and prepits, indicative of address information, are formed on the lands between the wobbling grooves at given intervals. The wavelength of the wobbling grooves is predetermined, which provides a wobble frequency (fw) for control of the rotation speed of the recording medium.

Figure 3A:
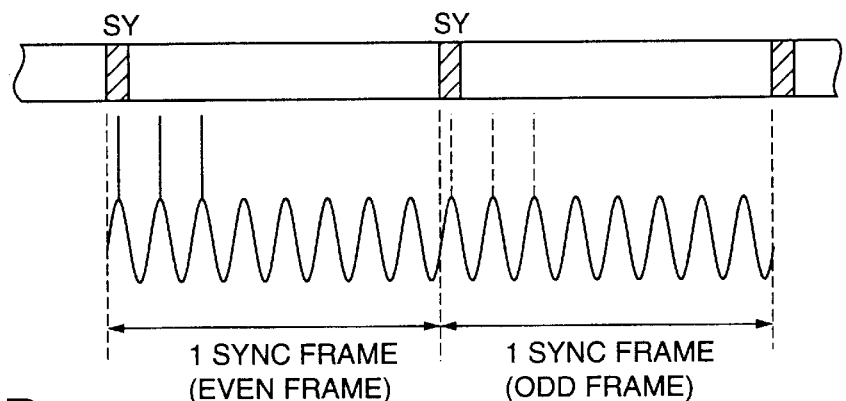
FIG. 3A and FIG. 3B are diagrams for explaining the arrangement of wobbles, prepits and sync patterns in a DVD-R format.
Figure 3B:
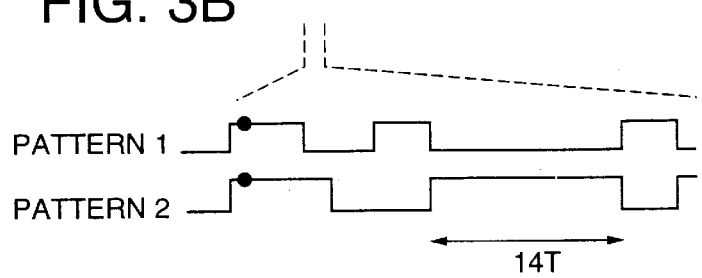

FIG. 3A and FIG. 3B are diagrams for explaining the arrangement of wobbles, prepits and sync patterns in a DVD-R format.

In the DVD-R format, a sequence of data blocks is recorded onto the recording medium. Each of the data blocks is called an ECC (error correcting code) block. One data block is made up of 16 sectors, and one sector is made up of 26 sync frames. Typically, one sync frame has a predetermined length corresponding to 1488T where T indicates a unit length corresponding to a channel bit, and a standard block length of one data block is equal to 16×26×1488T.

As shown in FIG. 3A, data recorded in the DVD-R format is divided into various sync frames. For the sake of simplicity, only a first sync frame (even-number frame) and a second sync frame (odd-number frame) are shown in FIG. 3A. Each of the sync frames contains sync information "SY" at a start location of the sync frame, and the sync information SY is provided to ensure the synchronization on a sync-frame basis. The sync information SY is also called the sync pattern or the sync pattern.

Source writing data (in 8-bit data format) which should be recorded on the DVD-R is converted into modulation codes (in 16-bit data format) by using a known 8/16 modulation scheme. The 8/16 modulation scheme is known and a description thereof will be omitted.

The modulation codes obtained as a result of the 8/16 modulation are further converted into a sequence of recording pulses by using a known NRZI (non-return to zero inverted) conversion scheme. The sequence of recording pulses is recorded onto the DVD-R. The NZRI conversion scheme is known and a description thereof will be omitted.

A length of each of the recording pulses along the track ranges from 3T to 11T where T indicates the unit length corresponding to the channel bit.

In the information recording method and apparatus of the present invention, when the modulation is performed, an improvement is provided to reduce or suppress the low-frequency components of the recording pulses.

An absolute value of a digital sum of the recording pulses is a measure of determination concerning the reduction of the low-frequency components of the recording pulses. The digital sum value (DSV) is defined as being a sum of digital values obtained by taking either one of two distinct states "+1" and "−1" for each of a sequence of bits corresponding to a sequence of recording pulses.

If the absolute value of the DSV is small, it is determined that the amount of the low-frequency components in the recording pulses is small. In the present invention, codes representing the sync patterns on the recording medium are selected such that the absolute value of the DSV of the recording pulses is minimized. Hereinafter, this method of selection of the sync pattern codes will be called a low-frequency reduction scheme.

In the sequence of recording pulses recorded on the DVD-R, the sync pattern SY is inserted at the start position of each sync frame. In the present example, the sync pattern SY has a length of 32 bits.

Unless the sync information SY is safely obtained, it is difficult to achieve the synchronization on a sync-frame basis. In order to safely obtain the sync information SY for every sync frame without error, the sync information SY generally has a length of 14T that is larger than the maximum pulse width 11T of the recording pulses.

In order to identify the position of one of the sync frames within one sector, a plurality of sync patterns are provided with respect to the sync information SY of the respective sync frames within one sector. One of the frame sync patterns is selected for each of the respective sync frames such that the linking condition between the preceding sync frame and the subject sync frame meets the modulation rule and the amount of the low-frequency components is reduced.

FIG. 3B shows the details of the sync information SY in the DVD-R format.

As shown in FIG. 3B, a pattern 1 and a pattern 2 are provided with respect to the sync information SY having a length of 14T. The pattern 1 of the sync information SY is a low-level pulse that creates a space on the recording medium. The pattern 2 of the sync information SY is a high-level pulse that creates a mark on the recording medium.

Based on the absolute value of the DSV, the determination concerning the reduction of the low-frequency components is performed. One of the pattern 1 and the pattern 2 is selected for each sync frame according to the result of the determination, such that the amount of the low-frequency components is reduced.

As shown in FIG. 3B, the pattern 2 corresponds to the high-level pulse for forming a mark on the recording medium, and the pattern 1 corresponds to the low-level pulse for forming a space on the recording medium. The selection of one of the pattern 1 or the pattern 2 for each sync frame can be easily determined based on the codes to be currently generated and on the polarity of the final pulse of the preceding sync frame.

In the example of FIG. 3B, when the final pulse of the preceding sync frame indicates a mark (the high-level pulse), the pattern 1 of the sync information SY is selected, which will form a space following the final pulse of the preceding sync frame. When the final pulse of the preceding sync frame indicates a space (the low-level pulse), the pattern 2 of the sync information SY is selected, which will form a mark following the final pulse of the preceding sync frame.

In a case in which a certain amount of the low-frequency components may be accepted, arbitrary selection of one of the pattern 1 or the pattern 2 for each sync frame is possible.

Generally, the sync information SY is smaller in length than the recording information. The amount of the low-frequency components produced when the above-described selection of sync frame pattern is performed as in the example of FIG. 3B is negligible. The selection of one of the pattern 1 or the pattern 2 for each sync frame is performed by using the originally prepared codes, and the information recorded by the above selection will conform to the modulation rule without causing a significant problem. In other words, any reproducing system having a typical decoder can be used to reproduce information from the recording medium on which the information is recorded by the information recording method of the present invention.

Further, in the recording medium, the wobbling grooves, indicative of rotation control information (or the wobble frequency fw), are formed as the tracks, a single prepit (which is called a sync prepit), indicative of frame sync information for each sync frame, is formed on the outer-side land of the wobbling groove of the subject sync frame, and a few prepits (which are called the prepits 0, 1 and 2), indicative of address information, are formed on the lands between the wobbling grooves at given intervals.

As shown in FIG. 3A, the prepits 0, 1 and 2, indicative of address information, correspond to a pair of an even-number sync frame (called the even frame) and an odd-number sync frame (called the odd frame) among the sync frames of one sector. The three prepits normally are placed only at the start location of the even frame. When it is expected that the neighboring prepits are provided on the lands which are adjacent to the land where the subject prepits are placed, the subject prepits are placed at the start location of the odd frame by shifting the position of the subject prepits, so as to avoid the interference between the subject prepits and the neighboring prepits.

As described above, the sync prepit, indicative of frame sync information for a sync frame, is formed on the outer-side land of the wobbling groove of the sync frame. In this case, another sync prepit, indicative of frame sync information for a different sync frame, is provided on the inner-side land of the wobbling groove of the former sync frame.

The wobble frequency fw of the wobbling grooves is eight times the frequency of the sync frames. The prepits 0, 1 and 2 are placed at the tops of the first three wobbles of one sync frame (normally, the even frame). The first one of these prepits is the sync prepit.

In addition, the length of each prepit in the track direction of the recording medium should be reduced as small as possible. Normally, the prepits are formed to have a length corresponding to a minimum number of channel bits T, which length is adequate for detecting them on the recording medium.

When data is recorded on the recording medium, the sync information SY (or the sync pattern or sync pattern having a length of 14T) is recorded on the track (the wobbling groove) in synchronism with the prepits (including the sync prepit) on the land adjacent to the track, such that the position of the sync information SY matches with the position of the sync prepit. A prepit signal is detected from one of the prepits on the recording medium during the writing, and the prepit signal, detected during the writing, is a base for carrying out accurate write position control.

The accuracy of detection of the prepit signal is important for carrying out accurate write position control. Not only the accuracy of detection of the prepit signal during the writing but also the accuracy of detection of the prepit signal during the reading of the already recorded data in the cases of the write-once media and the rewriting media, is important.

Figure 4A:
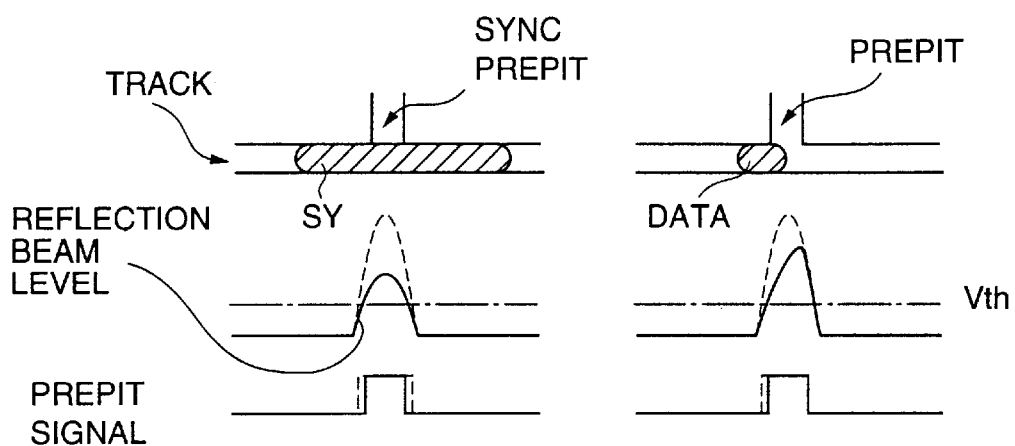
FIG. 4A and FIG. 4B are diagrams for explaining a relationship between the prepit signal and the track of the recording medium and a relationship between the recording pulse and the prepit signal.
Figure 4B:
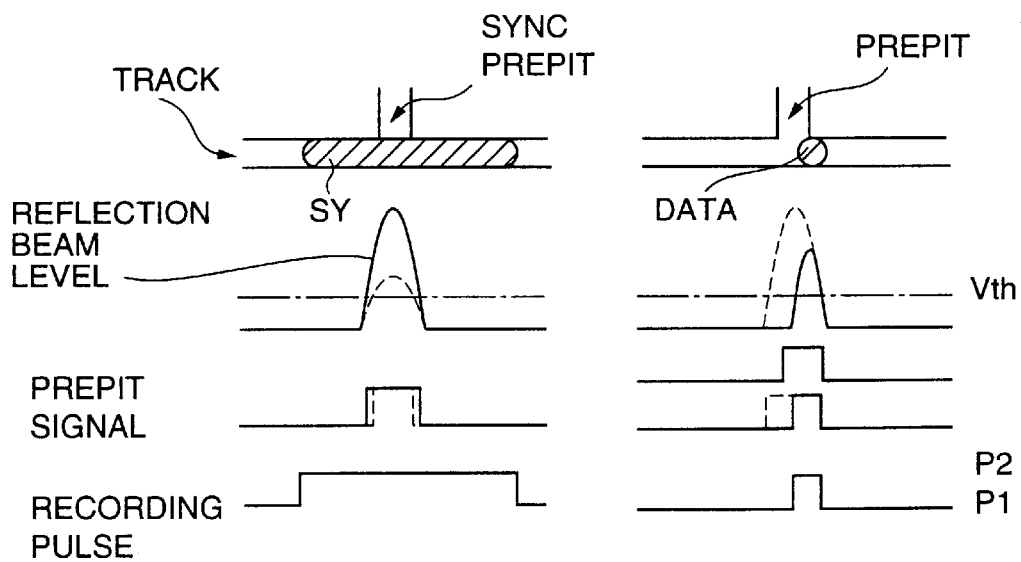

FIG. 4A and FIG. 4B are diagrams for explaining a relationship between the prepit signal and the track of the recording medium and a relationship between the recording pulse and the prepit signal.

FIG. 4A shows a relationship between the prepit signal and the track of the recording medium in which the sync information is already recorded on the track in synchronism with the prepits on the adjacent land such that the position of the sync information matches with the position of the sync prepit.

As shown in FIG. 4A, the sync information SY having a length of 14T (indicated by the shaded area at the left portion of FIG. 4A) is recorded on the track in synchronism with the sync prepit on the land adjacent to the track, such that the position of the sync information SY matches with the position of the sync prepit. The other ones of the prepits, different from the sync prepit, follow the sync prepit on the same land. A data mark having a length of 3T to 11T (indicated by the shaded area at the right portion of FIG. 4A), which follows the sync information SY, is formed on the track in synchronism with the prepit on the adjacent land, such that the position of the data mark matches with the position of the prepit.

The prepit signal is detected from the recording medium when a laser beam hits the prepit on the recording medium and a reflection beam from it is received. The level of intensity of the reflection beam when the laser beam strikes the sync prepit (or the mark) is indicated by the solid line waveform of FIG. 4A. The dotted line waveform of FIG. 4A indicates the level of intensity of the reflection beam when the laser beam strikes the space where no sync prepit is formed.

As is apparent from FIG. 4A, the prepit signal (or the rectangular pulsed signal) is produced by comparing the intensity level of the reflection beam with a given slicing level "Vth". When the laser beam hits the sync prepit and the position of the sync pattern (or the mark) on the adjacent track matches with the position of the sync prepit, the detected prepit signal has a little phase variation. Also, when the laser beam hits the prepit, other than the sync prepit, and the position of the mark on the adjacent track nearly matches the position of the prepit, the phase variation of the detected prepit signal is more likely to occur.

FIG. 4B shows a relationship between the recording pulse and the prepit signal when the prepit signal is detected from the recording medium during the writing.

For the sake of simplicity, it is supposed that a single pulse recording method is performed in the example of FIG. 4B. In the example of FIG. 4B, a first power level P1 (the low level) of the laser light source is used to form a space on the recording medium and a second power level P2 (the high level) of the laser light source is used to form a mark on the recording medium.

As shown in FIG. 4B, during a period of time that the laser beam hits the sync prepit, one of the first power level P1 or the second power level P2 is continuously applied to the laser light source with no power change. When the laser beam hits the sync prepit and the position of the mark (the sync pattern SY) on the adjacent track matches with the position of the sync prepit as indicated at the left portion of FIG. 4B, the detected prepit signal has no substantial phase variation. Therefore, it is possible to accurately detect the prepit signal from the sync prepit during the writing, for the purpose of the write position control.

However, during a period of time that the laser beam hits the prepit other than the sync prepit, the power applied to the laser light source varies between the first and second power levels P1 and P2 depending on a recording pattern of the data marks and spaces. Therefore, when the laser beam hits the prepit other than the sync prepit and the position of the mark on the adjacent track nearly matches the position of the prepit as indicated at the right portion of FIG. 4B, the phase variation of the detected prepit signal will not be negligible, which may cause an error in the detection of the prepit position.

As previously described, if the multipulse recording method is performed instead of the single pulse recording method, it is difficult for the multipulse recording method to accurately detect the prepit signal (for both the sync prepit and the other prepits) during the writing, for the purpose of the write position control.

Accordingly, it is preferred that the prepit signal be detected from the sync prepit, rather than the other prepits, on the recording medium, for the purpose of carrying out accurate write position control. Further, it is preferred that the sync pattern SY on the track adjacent to the land where the sync prepit is formed, the position of the sync pattern SY matching with the position of the sync prepit, is provided as a space on the recording medium, rather than a mark, for the purpose of carrying out accurate write position control.

The information recording method and apparatus of the present invention are configured such that a prepit position signal is produced by detecting the sync prepit on the recording medium, and the sync pattern on the track adjacent to the land where the sync prepit is formed, the position of the sync pattern SY matching with the position of the sync prepit, is provided as a space on the recording medium, which will be described in greater detail below.

Figure 1:
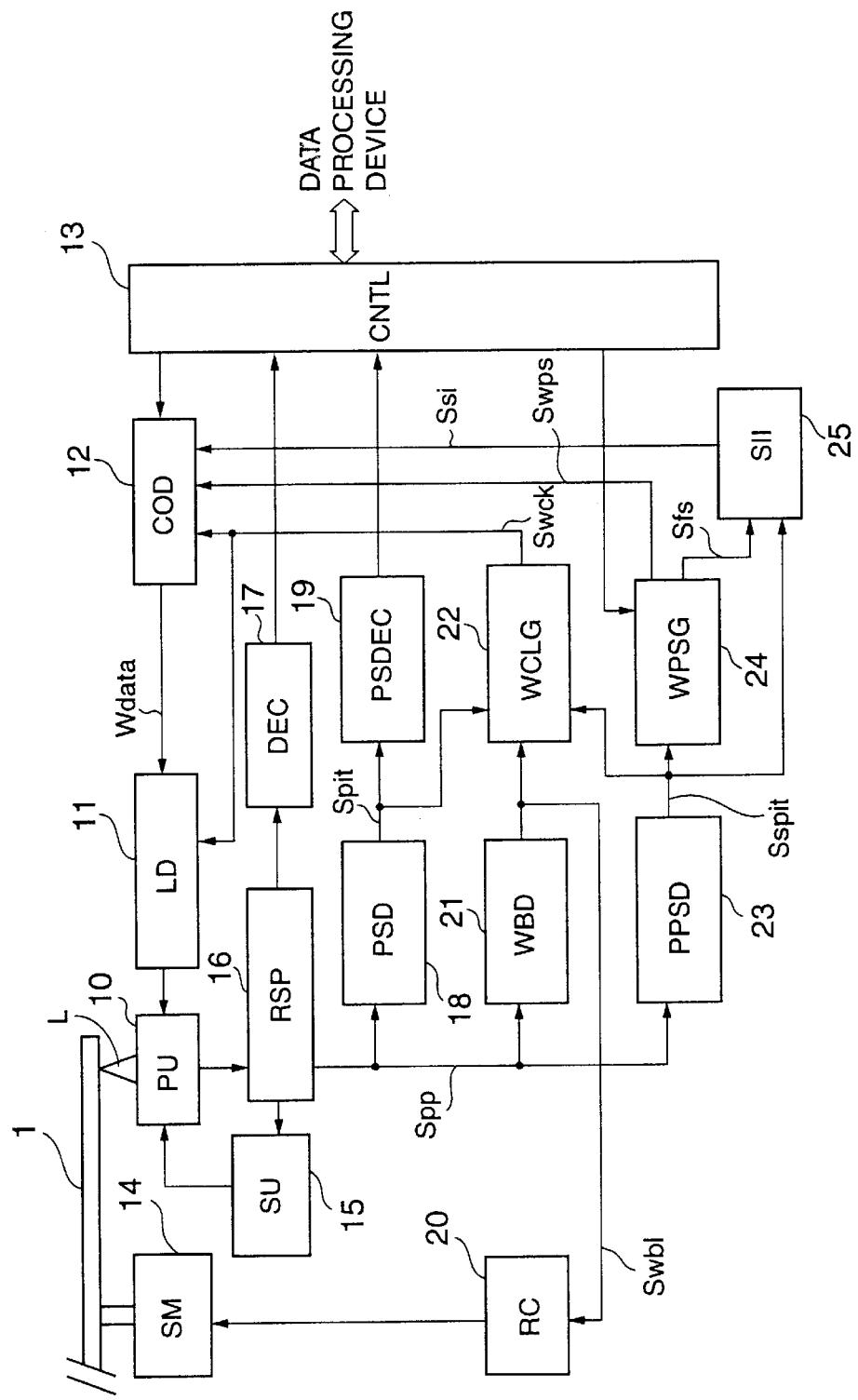
FIG. 1 is a block diagram of one preferred embodiment of the information recording apparatus of the invention.

FIG. 1 shows one preferred embodiment of the information recording apparatus of the invention.

As shown in FIG. 1, the information recording apparatus of the present embodiment generally comprises a pickup (PU) 10, a laser driver (LD) 11, a data encoder (COD) 12, a controller (CNTL) 13, a spindle motor (SM) 14, a servo unit (SU) 15, and a rotation control unit (RC) 20. The spindle motor 14 rotates an optical recording medium 1 around the center of the recording medium 1. The controller 13 includes an interface circuit (not shown) which provides a PC interface between the information recording apparatus and an external data processing device (not shown), such as a host computer.

The information recording apparatus of FIG. 1 further includes a readout signal processing unit (RSP) 16, a data decoder (DEC) 17, a prepit signal detector (PSD) 18, a prepit signal decoder (PSDEC) 19, a wobble signal detector (WBD) 21, a write clock generator (WCG) 22, a prepit position signal detector (PPSD) 23, a write position signal generator (WPSG) 24, and a sync information indication unit (SII) 25.

In the information recording apparatus of FIG. 1, the pickup 10 includes a laser light source, focusing optics and a light receiving unit. The pickup 10 focuses a laser beam (L), emitted by the light source, on the surface of the recording medium 1 by the focusing optics. The pickup 10 receives a reflection beam from the recording medium and converts the received beam into an electric signal by the light receiving unit.

The laser driver 11 controls and drives the light source of the pickup 10 so that the intensity of the laser beam L is set at a controlled level. When data is recorded onto the recording medium 1, the laser driver 11 provides the modulation of the laser beam in accordance with a sequence of recording pulses "Wdata" sent by the data encoder 12, to the light source of the pickup 10. The modulation of the laser beam during the writing is executed by the laser driver 11 in synchronism with a write clock signal "Swck". The pickup 10 then records a sequence of data blocks on the surface of the recording medium 1 by radiating the modulated laser beam to the recording medium 1.

The data encoder 12 operates on the write clock signal "Swck" during the writing. The data encoder 12 receives source writing data delivered by the controller 13, and executes an error correcting code (ECC) process, an 8/16 modulation process and an interleaving process so that the received data is converted into the sequence of recording pulses "Wdata". The data encoder 12 starts outputting the sequence of the recording pulses "Wdata" to the laser driver 11 in response to a write-position start signal "Swps".

The readout signal processing unit 16 processes the signal output by the pickup 10, so that the readout signal processing unit 16 produces a readout signal, a servo signal and a push-pull signal "Spp". The method of producing the push-pull signal Spp is known.

In the readout signal processing unit 16, two photodetectors are arranged in parallel to the track direction (the tangential direction) of the recording medium 1, and receive reflection beams from the recording medium 1 and output detection signals. The push-pull signal Spp is produced by taking a difference between the two output signals of the photodetectors.

Figure 2:
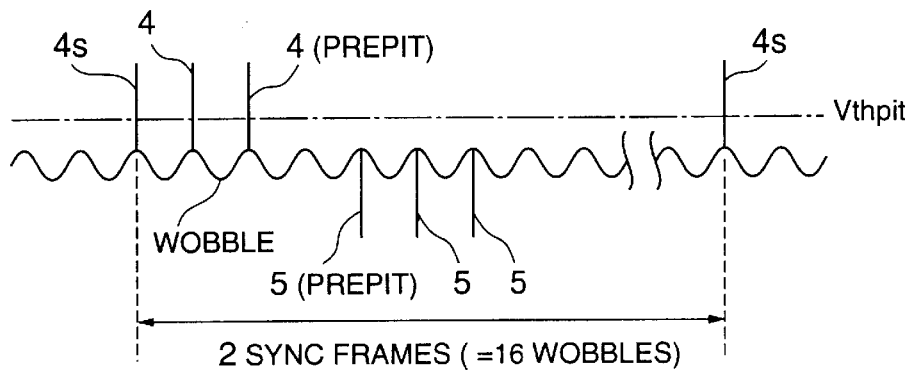
FIG. 2 is a time chart of a push-pull signal produced by a readout signal processing unit in the information recording apparatus.

FIG. 2 is a time chart of a push-pull signal produced by the readout signal processing unit 16 in the information recording apparatus of FIG. 1.

As shown in FIG. 2, the push-pull signal is a composite signal in which the prepit signal is superimposed on the wobble signal. As in the example of the waveform of FIG. 2, the prepit components 4 and 5 of the push-pull signal are placed at the upper end and the lower end of the wobble signal, which correspond to the prepits on the outer-side land of the instant wobbling groove (which is scanned by the pickup 10) and the prepits on the inner-side land of the instant wobbling groove in the recording medium 1. Each prepit component appears in the push-pull signal when the amplitude of the wobble signal nearly reaches the maximum.

The first prepit component 4s of the push-pull signal (corresponding to 2 sync frames) corresponds to the sync prepit on the recording medium 1. Normally, the first prepit component 4s, corresponding to the sync prepit, appears at the start location of every two sync frames. However, where the even frame or the odd frame is shifted, the first prepit components 4s are separated from each other at the distance of one or three sync frames.

The prepit components 5 are related to the prepits that indicate address information of data recorded onto another wobbling groove adjacent to the instant wobbling groove which is scanned by the pickup 10. As shown in FIG. 2, the phase of the prepit signal in relation to the phase of the wobble signal varies at the respective instants.

For the purpose of a subsequent-stage signal processing, the push-pull signal, produced by taking the difference between the two output signals of the photodetectors, may be subjected to a gain adjustment by the readout signal processing unit 16. The gain adjustment of the push-pull signal is performed by using a sum signal produced by taking a sum of the two output signals of the photodetectors.

Further, the readout signal processing unit 16 may output the push-pull signal Spp after it is passed through a high-pass filter and the DC components are suppressed. Modifying the readout signal processing unit 16 in this manner makes it possible to remove the offset elements of the push-pull signal.

The data decoder 17 decodes the readout signal, sent by the readout signal processing unit 16, into a demodulation signal, and sends the demodulation signal to the controller 13.

The servo unit 15 controls the pickup 10 based on the servo signal sent by the readout signal processing unit 16, so that the laser beam emitted by the pickup 10 is radiated to a controlled position on the recording medium 1.

The rotation control unit 20 controls the rotation of the spindle motor 14 based on a wobble signal Swbl output by the wobble signal detector 21, so that the recording medium 1 is rotated by the spindle motor 14 at a controlled speed. In the present embodiment, the wobble signal is used for the rotation control of the recording medium 1. Alternatively, the prepit signal may be used for this purpose.

The prepit signal detector 18 produces a prepit signal "Spit" based on the push-pull signal Spp sent by the readout signal processing unit 16. The prepit signal detector 18 includes a comparator which outputs a detection signal by comparing the amplitude of the push-pull signal Spp with a predetermined threshold ("Vthpit" indicated in FIG. 2).

The prepit signal decoder 19 reconstructs the address information of the recording medium 1 from the prepit signal Spit sent by the prepit signal detector 18, and sends the address information to the controller 13.

The wobble signal detector 21 produces the wobble signal "Swbl" by receiving the push-pull signal Spp from the readout signal processing unit 16 and passing it through a band-pass filter.

The write clock generator 22 produces a write clock signal "Swck" based on the wobble signal "Swbl", the prepit signal "Spit" and a prepit position signal "Sspit" or based on a composite signal of these signals. The write clock generator 22 generally includes a phase locked loop (PLL). The writing of data to the recording medium 1 is performed by the elements of the information recording apparatus on the basis of the write clock signal "Swck" sent by the write clock generator 22.

The prepit position signal detector 23 produces a prepit position signal "Sspit" based on the prepit signal Spp sent by the readout signal processing unit 16, and the prepit position signal is indicative of the position of a prepit (at least a sync prepit) on the recording medium 1 with accuracy. Similar to the prepit signal detector 18, the prepit position signal detector 23 includes a comparator which outputs a detection signal by comparing the amplitude of the push-pull signal Spp with a predetermined threshold.

Alternatively, the entire or partial portion of the prepit signal detector 18 and the prepit position signal detector 23 may be constructed as a common circuit block. In the embodiment of FIG. 1, the prepit signal detector 18 and the prepit position signal detector 23 are provided as separate circuit blocks, for the purpose of clarifying the features of the present invention.

The prepit position signal detector 23 in the present embodiment uses a simple comparator having a given slicing level, and can produce the prepit position signal "Sspit" with accuracy based on the prepit signal Spp. Specifically, the prepit position signal detector 23 may be configured to produce a prepit position signal "Sspit" indicative of only the position of a sync prepit on the recording medium 1 with high accuracy.

The write position signal generator 24 operates in response to a write start command or a write start address command sent by the controller 13, and produces a write-position start signal "Swps" the phase of which is locked to the phase of the prepit position signal "Sspit" output by the prepit position signal detector 23. The write-position start signal Swps is delivered to the data encoder 12.

The write position signal generator 24 is provided with a PLL (phase locked loop), and produces a frame sync signal "Sfs" the phase of which is locked to the phase of the prepit position signal "Sspit". The write position signal generator 24 outputs the write-position start signal "Swps" in accordance with the frame sync signal "Sfs". The write position signal generator 24 is configured in this manner, and it is possible to produce the write-position signal "Swps" with high accuracy, even when an error of the detection of the prepit position signal takes place due to noises or the like. The frame sync signal "Sfs" is delivered to the sync information indication unit 25.

The sync information indication unit 25 receives the prepit position signal "Sspit" from the prepit position signal detector 23 and the sync-frame signal "Sfs" from the write position signal generator 24, and produces a sync-pattern indicator signal "Ssi" based on these signals. The sync-pattern indicator signal "Ssi" is delivered to the data encoder 12, so that the sync pattern SY (having a length of 14T) on the track adjacent to the land where the sync prepit is formed, the position of the sync pattern matching with the position of the sync prepit, is formed as a space on the recording medium 1.

Figure 5:
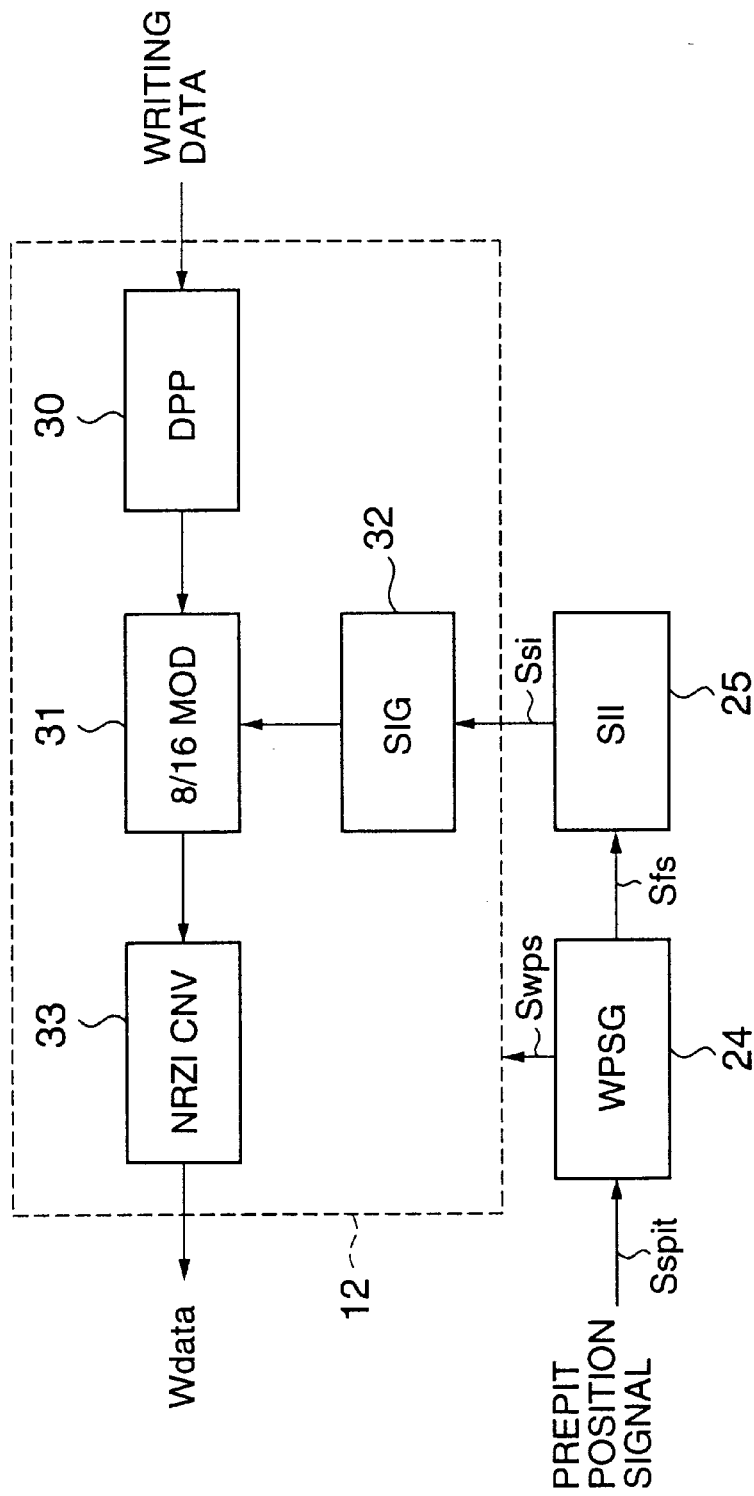
FIG. 5 is a block diagram of a data encoder in the information recording apparatus.

FIG. 5 shows the construction of the data encoder 12 in the information recording apparatus of FIG. 1.

As shown in FIG. 5, the data encoder 12 generally comprises a data preprocessing unit (DPP) 30, an 8/16 modulation unit (8/16 MOD) 31, a sync information generator (SIG) 32, and an NRZI conversion unit (NRZI CNV) 33.

As previously described, the data encoder 12 operates on the write clock signal "Swck" during the writing. The data encoder 12 receives the source writing data delivered by the controller 13, and executes the ECC process, the 8/16 modulation process and the interleaving process so that the received source writing data is converted into the sequence of recording pulses "Wdata". The data encoder 12 starts outputting the sequence of the recording pulses "Wdata" to the laser driver 11 in response to the write-position start signal "Swps".

In the data encoder 12 of FIG. 5, the data preprocessing unit 30 executes the ECC process and the interleaving process for the writing data sent by the controller 13.

The 8/16 modulation unit 31 executes the 8/16 modulation process for the data signal sent by the data preprocessing unit 30, in accordance with a given modulation rule. The 8/16 modulation unit 31 receives the sync pattern SY from the sync information generator 32 and inserts the received sync pattern SY at the start position of every sync frame. The 8/16 modulation unit 31 produces the modulation codes from the sync frames in which the sync patterns SY are inserted, through the 8/16 modulation process. In a certain condition, the 8/16 modulation process is executed such that the low-frequency components are reduced or suppressed.

The sync information generator 32 selects codes that represent the sync information SY. Specifically, in a certain condition, the sync information generator 32 selects the codes such that the linking condition between the preceding sync frame and the current sync frame meets the modulation rule. In a certain condition, the sync information generator 32 selects the codes such that the low-frequency components are reduced as small as possible.

The selection of the codes is performed by the sync information generator 32 based on the sync-pattern indicator signal Ssi sent by the sync information indication unit 25. When the signal Ssi is valid, the generator 32 selects the codes such that the sync pattern is formed as a space on the recording medium 1. When the signal Ssi is invalid, the generator 32 selects the codes such that the low-frequency components are reduced as small as possible.

The NRZI conversion unit 33 generates a sequence of recording pulses (or the writing data "Wdata") by converting the modulation codes, output by the 8/16 modulation unit 31, by using the NRZI conversion scheme.

In the present embodiment, the sync information indication unit 25 and the sync information generator 32 in combination serve to provide the function of the sync information generating means in the claims.

A description will now be provided of several algorithms for sync-pattern indicator signal generation which can be used by the sync information indication unit 25 in the present embodiment.

The first algorithm is that the sync information indication unit 25 sets the sync-pattern indicator signal Ssi of each of the sequence of sync frames as being valid, and the sync information generator 32 selects codes that represent the sync information SY so that all the sync patterns of the sync frames are formed as a space on the recording medium 1.

With a simple construction, it is possible for the first algorithm to detect with high accuracy the prepit position signal "Sspit" from each of the sync prepits for the sequence of sync frames, which will allow the information recording apparatus and method of the present embodiment to carry out accurate write position control based on the detected prepit position signal.

The second algorithm is that the sync information indication unit 25 sets the sync-pattern indicator signal Ssi of each of a portion of the sequence of sync frames as being valid and sets the signal Ssi of the remainder of the sequence of sync frames as being invalid, and the sync information generator 32 selects the codes that represent the sync information SY so that the sync patterns of the portion of the sync frames are formed as a space on the recording medium 1, and selects the codes that represent the sync information SY so that the sync patterns of the remainder of the sync frames are formed on the recording medium 1 so as to meet the low-frequency reduction scheme.

For example, the sync-pattern indicator signal Ssi for one of the even-number sync frames and the odd-number sync frames in the DVD-R format is set to be valid, and the signal Ssi for the other of the even frames and the odd frames is set to be invalid. In the DVD-R format, the prepits are formed only in one of the even frames and the odd frames. The signal Ssi for the one of the even frames and the odd frames in which the prepits are formed is set to be valid. The position of at least one of the sync prepits in the DVD-R matches with the position of the sync pattern SY. The prepit position signal Sspit can be accurately detected from it, and the write position control can be accurately carried out based on the detected prepit position signal Sspit.

In addition, the sync patterns of the remainder of the sync frames are formed so as to meet the low-frequency reduction scheme, and the information recording apparatus and method of the present embodiment are effective in reducing the amount of the low-frequency components of the recording pulses.

When the position of the sync prepit matches with the position of the sync pattern formed as a mark on the recording medium, the prepit position signal Sspit, detected in such a case, is discarded, which will allow the write position control to be more accurately performed. In other words, only when the position of the sync prepit matches with the position of the sync pattern formed as a space on the recording medium, the prepit position signal Sspit is detected and the write position control is performed based on the detected signal Sspit. This procedure can be also performed when the other algorithms than the second algorithm are applied to the information recording apparatus and method of the present embodiment.

The third algorithm is that the sync information indication unit 25 sets the sync-pattern indicator signal Ssi for one of the even frames and the odd frames in the sequence of sync frames as being valid and sets the signal Ssi for the other of the even frames and the odd frames as being invalid. The sync information generator 32 selects the codes that represent first sync patterns for one of the even frames and the odd frames such that each of the first sync patterns is formed as a space on the recording medium, when positions of the first sync patterns match with positions of the prepits. The sync information generator 32 selects the codes that represent second sync patterns for the other of the even frames and the odd frames such that each of the second sync pattern is formed on the recording medium so as to meet the low-frequency reduction scheme, when positions of the second sync patterns do not match with the positions of the prepits.

In the case of the third algorithm, it is supposed that the prepits are formed on the lands of the recording medium 1 at given intervals that are equal to an integral multiple of the unit length T corresponding to the channel bit.

Figure 6:
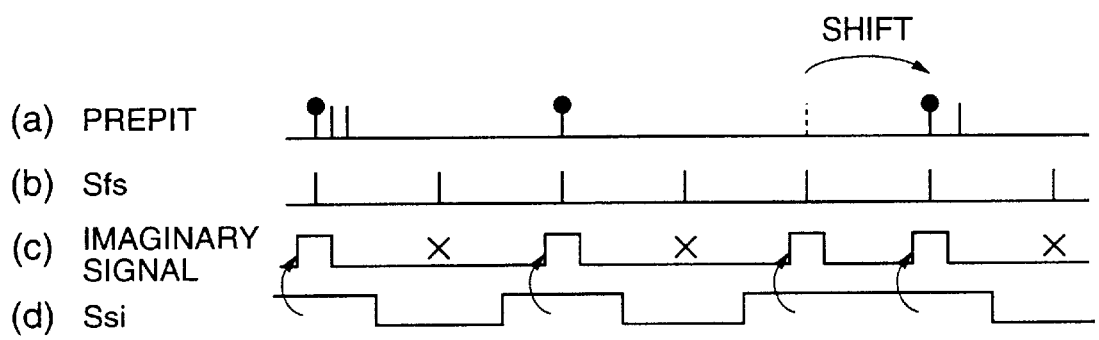
FIG. 6 is a time chart for explaining various signals produced when a sync information generator in the information recording apparatus operates according to a third algorithm provided by the invention.

FIG. 6 is a time chart for explaining various signals produced when the sync information generator 32 in the information recording apparatus of FIG. 1 operates according to the third algorithm.

The prepits on the recording medium 1 are indicated by (a) in FIG. 6. The black dots in (a) in FIG. 6 denote the sync prepits the positions of which match with the position of the sync pattern which is formed as a space on the recording medium 1. As described above, if the prepit position signal is detected from one of the sync prepits, the detected prepit position signal provides high accuracy.

The frame-sync signal "Sfs", the phase of which is locked to the phase of the prepit position signal, is indicated by (b) in FIG. 6.

An imaginary signal which is set to the high level only when the sync pattern is formed as a space on the recording medium is indicated by (c) in FIG. 6. The imaginary signal is set to the high level or the low level in accordance with the low-frequency reduction scheme. The "X" symbols in (c) in FIG. 6 indicate the timing of the selection of the low level by the low-frequency reduction scheme.

The sync-pattern indicator signal Ssi, supplied by the sync information indication unit 25, is indicated by (d) in FIG. 6. When the signal Ssi is set to be valid (the high level), the sync information generator 32 selects the codes that represent the first sync patterns for one of the even frames and the odd frames such that each of the first sync patterns is formed as a space.

Usually, the sync-pattern indicator signal Ssi is set to the high level for each of the even frames. When the position of the prepits is shifted from the even frame to the odd frame, the signal Ssi is set to the high level for the odd frame (or the frame immediately after the shift to the odd frame).

The shifting of the position of the prepits from the even frame to the odd frame does not frequently occur. It is possible for the third algorithm to detect with high accuracy the prepit position signal "Sspit" from each of the sync prepits except for the shifting region. The information recording apparatus and method of the present embodiment are effective in carrying out accurate write position control based on the detected prepit position signal.

The fourth algorithm is that the sync information indication unit 25 sets the sync-pattern indicator signal Ssi as being valid when the position of the sync prepit continuously does not match with the position of the sync pattern formed as a space on the recording medium 1 for more than a predetermined number of the sync frames, and otherwise sets the sync-pattern indicator signal Ssi as being invalid. The sync information generator 32 selects the codes that represent first sync patterns for a portion of the sync frames such that each of the first sync patterns is formed as a space, when the number of the first sync patterns being successively formed as a mark, positions of the first sync patterns matching with positions of the prepits, is larger than the predetermined number, and otherwise selecting codes that represent second sync patterns for the remainder of the sync frames such that each of the second sync pattern is formed so as to meet the low-frequency reduction scheme.

Figure 7:
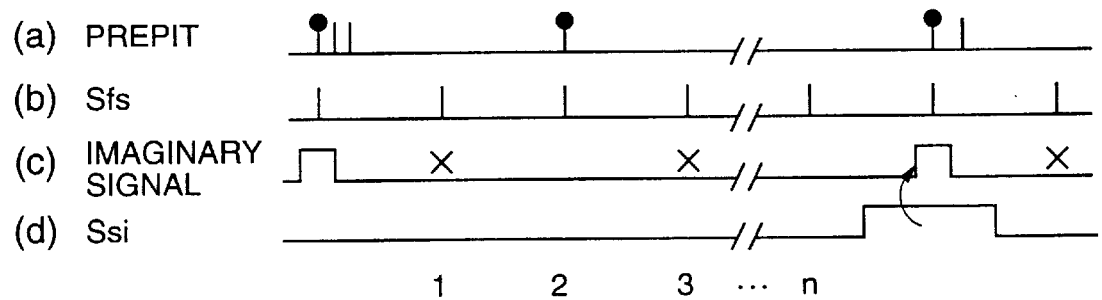
FIG. 7 is a time chart for explaining various signals produced when the sync information generator in the information recording apparatus operates according to a fourth algorithm provided by the invention.

FIG. 7 is a time chart for explaining various signals produced when the sync information generator 32 in the information recording apparatus of FIG. 1 operates according to the fourth algorithm. The signals, indicated in FIG. 7, are the same as corresponding signals in FIG. 6, and a description thereof will be omitted.

As shown in FIG. 7, when the position of the sync prepit continuously does not match with the position of the sync pattern formed as a space, for more than the "n" sync frames, the sync-pattern indicator signal Ssi is set to be valid (the high level). The codes that represent the sync pattern for a next sync frame following the "n" sync frames, are selected such that the sync pattern is formed as a space.

Clearly, when the position of the sync prepit does match with the position of the sync pattern (formed as a space by the low-frequency reduction scheme) within the "n" sync frames, the sync-pattern indicator signal Ssi is set to be invalid (the low level). It is unnecessary to select the codes that represent the sync pattern for a next sync frame such that the sync pattern is formed as a space.

It is possible for the fourth algorithm to detect with high accuracy the prepit position signal "Sspit" from each of the sync prepits within a sufficient range of the sync frames. The information recording apparatus and method of the present embodiment are effective in carrying out accurate write position control based on the detected prepit position signal, and effective in reducing the low-frequency components of the recording pulses.

Further, according to any of the second through fourth algorithms, when a difference between the absolute values of DSV of the selected codes for the second sync patterns is equal to zero or less than a predetermined value, the second sync pattern codes are selected such that each second sync pattern is formed as a space on the recording medium. In this case, the effect of the reduction of the low-frequency components is not eliminated even when the second sync pattern codes are selected so as to form a space. The information recording apparatus and method of the present embodiment are effective in carrying out accurate write position control, and does not significantly deteriorate the reduction of the low-frequency components of the recording pulses.

In the above-described embodiments, the DVD-R which is a write-once recording medium is taken as one example of the recording medium appropriate for use in the information recording method and apparatus of the present invention. However, the present invention is not limited to this example. It is readily understood that the above embodiments are also applicable to, for example, optical recording media having a recording layer of a phase-change recording material, such as rewritable DVD media, or other recording media having a recording layer of another recording material.

Further, the preformat method of the recording medium is not limited to the above-described embodiments. It is readily understood that the above embodiments are also applicable to, for example, an optical recording medium in which the wobbling grooves (or lands) are formed as the tracks and the prepits are formed on both or one of the outer-side land (or groove) and the inner-side land (or groove) adjacent to the instant track. Further, the above-described embodiments are applicable to an optical recording medium in which no wobble grooves are formed and the prepits are formed on the lands between the tracks at given intervals.

Figure 8:
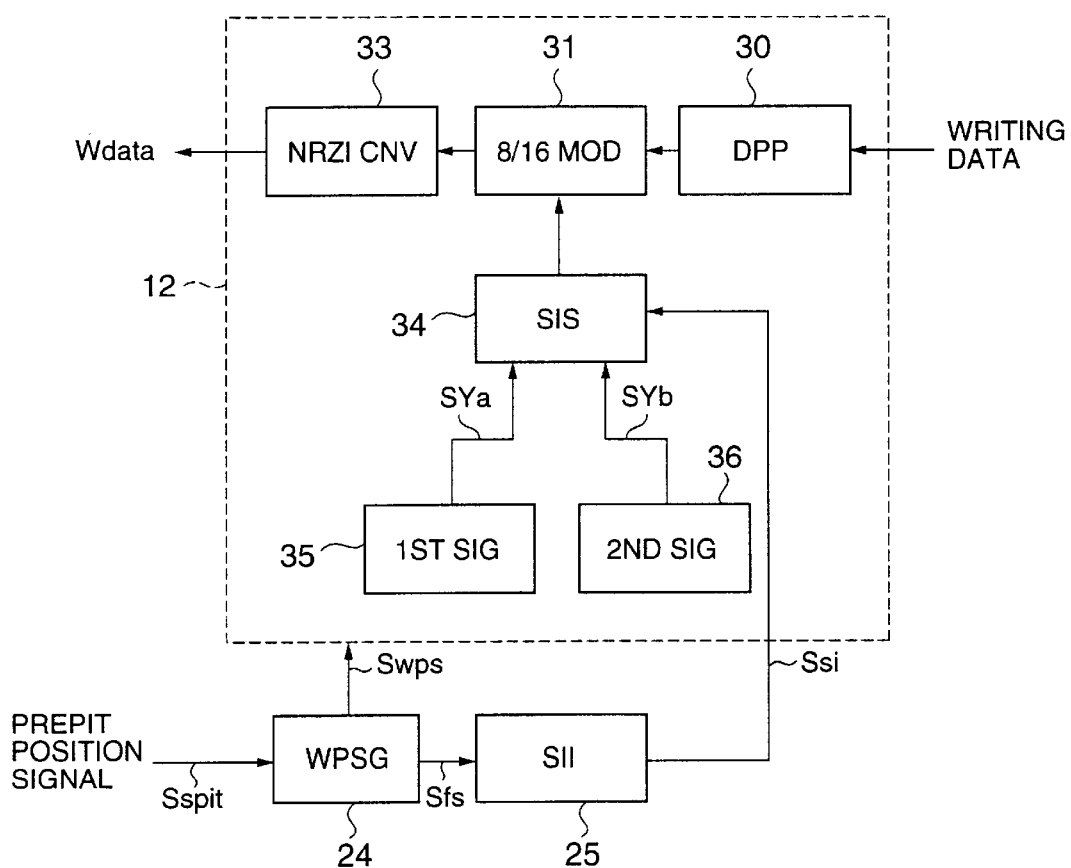
FIG. 8 is a block diagram of a data encoder in another preferred embodiment of the information recording apparatus of the invention.

Next, FIG. 8 shows the construction of a data encoder in another preferred embodiment of the information recording apparatus of the invention.

In the present embodiment, the construction of the information recording apparatus is essentially the same as that of the previous embodiment of FIG. 1, and a description thereof will be omitted for the sake of simplicity.

Accordingly, the data encoder 12 shown in FIG. 8 is considered as being provided in the information recording apparatus of the present embodiment, which is the same as the information recording apparatus of FIG. 1. The same reference numerals are used to indicate the same elements in the information recording apparatus.

As shown in FIG. 8, the data encoder 12 of the present embodiment generally comprises a data preprocessing unit (DPP) 30, an 8/16 modulation unit (8/16 MOD) 31, an NRZI conversion unit (NRZI CNV) 33, a sync information selector (SIS) 34, a first sync information generator (1ST SIG) 35, and a second sync information generator (2ND SIG) 36. The write position signal generator (WPSG) 24 and the sync information indication unit (SII) 25 are essentially the same as corresponding elements in FIG. 5, and a description thereof will be omitted.

The data encoder 12 operates on the write clock signal "Swck"during the writing. The data encoder 12 receives the source writing data delivered by the controller 13, and executes the ECC process, the 8/16 modulation process and the interleaving process so that the received source writing data is converted into the sequence of recording pulses "Wdata". The data encoder 12 starts outputting the sequence of the recording pulses "Wdata" to the laser driver 11 in response to the write-position start signal "Swps".

In the data encoder 12 of FIG. 8, the data preprocessing unit 30 executes the ECC process and the interleaving process for the writing data sent by the controller 13.

The 8/16 modulation unit 31 executes the 8/16 modulation process for the data signal sent by the data preprocessing unit 30, in accordance with a given modulation rule. The 8/16 modulation unit 31 receives the sync pattern SY from the sync information generator 32 and inserts the received sync pattern SY at the start position of every sync frame. The 8/16 modulation unit 31 produces the modulation codes from the sync frames in which the sync patterns SY are inserted, through the 8/16 modulation process. In a certain condition, the 8/16 modulation process is executed such that the low-frequency components are reduced or suppressed.

The first sync information generator 35 generates first codes SYa that represent first sync patterns for a portion of the sync frames such that each first sync pattern is formed as a space on the recording medium 1.

The second sync information generator 36 generates second codes SYb that represent second sync patterns for the remainder of the sync frames such that each second sync pattern is formed on the recording medium 1 so as to meet the low-frequency reduction scheme.

The sync information selector 34 selects codes that represent the sync information SY. Specifically, in a certain condition, the sync information selector 34 selects the codes such that the linking condition between the preceding sync frame and the current sync frame meets the modulation rule. In a certain condition, the sync information selector 34 selects the codes such that the low-frequency components are reduced as small as possible.

The selection of one of the first codes SYa or the second codes SYb is performed by the sync information selector 34 based on the sync-pattern indicator signal Ssi sent by the sync information indication unit 25. When the signal Ssi is valid, the selector 34 selects the first codes SYa such that the sync pattern is formed as a space on the recording medium 1. When the signal Ssi is invalid, the selector 34 selects the second codes SYb such that the low-frequency components are reduced as small as possible.

The NRZI conversion unit 33 generates a sequence of recording pulses (or the writing data "Wdata") by converting the modulation codes, output by the 8/16 modulation unit 31, by using the NRZI conversion scheme.

Accordingly, it is readily understood that information recording apparatus and method of the present embodiment are effective in carrying out accurate write position control, and does not significantly deteriorate the reduction of the low-frequency components of the recording pulses.

Further, it is readily understood that the above-described embodiment is applicable to, for example, optical recording media having a recording layer of a phase-change recording material, such as rewritable DVD media, or other recording media having a recording layer of another recording material.

Further, it is readily understood that the above-described embodiment is applicable to, for example, an optical recording medium in which the wobbling grooves (or lands) are formed as the tracks and the prepits are formed on both or one of the outer-side land (or groove) and the inner-side land (or groove) adjacent to the instant track. Further, the above-described embodiment is applicable to an optical recording medium in which no wobble grooves are formed and the prepits are formed on the lands between the tracks at given intervals.

The present invention is not limited to the above-described embodiments, and variations and modifications may be made without departing from the scope of the present invention.

Further, the present invention is based on Japanese priority application No. 11-155711, filed on Jun. 2, 1999, and Japanese priority application No. 11-373116, filed on Dec. 28, 1999, the entire contents of which are hereby incorporated by reference.

What is claimed is:

1. An information recording method for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, the information recording method comprising the steps of:

selecting codes that represent sync patterns for the sync frames such that each sync pattern is formed as a space on the recording medium;

generating modulation codes based on the sync frames in which the selected codes are inserted, by modulating the sync frames containing the selected codes in accordance with a predetermined modulation scheme;

generating a sequence of recording pulses by converting the modulation codes through a predetermined conversion scheme; and detecting a prepit position signal from one of the prepits for each of the sync frames during the writing of the recording pulses to the recording medium, so that a write position control is performed based the detected prepit position signal.

2. An information recording method for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, the information recording method comprising the steps of:

selecting codes that represent first sync patterns for a portion of the sync frames such that each first sync pattern is formed as a space on the recording medium, and selecting codes that represent second sync patterns for the remainder of the sync frames such that each second sync pattern is formed on the recording medium so as to meet a low-frequency reduction scheme;

generating modulation codes based on the sync frames in which the selected codes are inserted, by modulating the sync frames containing the selected codes in accordance with a predetermined modulation scheme;

generating a sequence of recording pulses by converting the modulation codes through a predetermined conversion scheme; and detecting a prepit position signal from one of the prepits for each of the sync frames during the writing of the recording pulses to the recording medium, so that a write position control is performed based the detected prepit position signal.

3. An information recording method for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, the information recording method comprising the steps of:

providing the prepits which are formed on the lands of the recording medium at intervals that are equal to an integral multiple of a unit length corresponding to a channel bit;

selecting codes that represent first sync patterns for a portion of the sync frames such that each of the first sync patterns is formed as a space on the recording medium, when positions of the first sync patterns match with positions of the prepits, and selecting codes that represent second sync patterns for the remainder of the sync frames such that each of the second sync pattern is formed on the recording medium so as to meet a low-frequency reduction scheme, when positions of the second sync patterns do not match with the positions of the prepits;

generating modulation codes based on the sync frames in which the selected codes are inserted, by modulating the sync frames containing the selected codes in accordance with a predetermined modulation scheme;

generating a sequence of recording pulses by converting the modulation codes through a predetermined conversion scheme; and detecting a prepit position signal from one of the prepits for each of the sync frames during the writing of the recording pulses to the recording medium, so that a write position control is performed based the detected prepit position signal.

4. An information recording method for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, the information recording method comprising the steps of:

selecting codes that represent first sync patterns for a portion of the sync frames such that each of the first sync patterns is formed as a space, when the number of the first sync patterns being successively formed as a mark, positions of the first sync patterns matching with positions of the prepits, is larger than a predetermined number, and otherwise selecting codes that represent second sync patterns for the remainder of the sync frames such that each of the second sync pattern is formed so as to meet a low-frequency reduction scheme;

generating modulation codes based on the sync frames in which the selected codes are inserted, by modulating the sync frames containing the selected codes in accordance with a predetermined modulation scheme;

generating a sequence of recording pulses by converting the modulation codes through a predetermined conversion scheme; and detecting a prepit position signal from one of the prepits for each of the sync frames during the writing of the recording pulses to the recording medium, so that a write position control is performed based the detected prepit position signal.

5. The information recording method of claim 2, wherein in said selecting step, when a difference between absolute values of digital sum of the selected codes for the second sync patterns is equal to zero or less than a predetermined value, the second sync pattern codes are selected such that each second sync pattern is formed as a space on the recording medium.

6. An information recording apparatus for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, the information recording apparatus comprising:

sync information generating means for selecting codes that represent sync patterns for the sync frames such that each sync pattern is formed as a space on the recording medium;

prepit position signal detecting means for detecting a prepit position signal from one of the prepits for each of the sync frames during the writing of the recording pulses to the recording medium;

write position signal generating means for generating a write-position start signal based on the prepit position signal detected by the prepit position signal detecting means; and data encoding means for generating modulation codes based on the sync frames in which the codes selected by the sync information generating means are inserted, by modulating the sync frames containing the selected codes in accordance with a predetermined modulation scheme, the data encoding means generating a sequence of recording pulses by converting the modulation codes through a predetermined conversion scheme, and the data encoding means starting outputting the sequence of recording pulses in accordance with the write-position start signal supplied by the write position signal generating means.

7. An information recording apparatus for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, the information recording apparatus comprising:

sync information generating means for selecting codes that represent first sync patterns for a portion of the sync frames such that each first sync pattern is formed as a space on the recording medium, and selecting codes that represent second sync patterns for the remainder of the sync frames such that each second sync pattern is formed on the recording medium so as to meet a low-frequency reduction scheme;

prepit position signal detecting means for detecting a prepit position signal from one of the prepits for each of the sync frames during the writing of the recording pulses to the recording medium;

write position signal generating means for generating a write-position start signal based on the prepit position signal detected by the prepit position signal detecting means; and data encoding means for generating modulation codes based on the sync frames in which the codes selected by the sync information generating means are inserted, by modulating the sync frames containing the selected codes in accordance with a predetermined modulation scheme, the data encoding means generating a sequence of recording pulses by converting the modulation codes through a predetermined conversion scheme, and the data encoding means starting outputting the sequence of recording pulses in accordance with the write-position start signal supplied by the write position signal generating means.

8. An information recording apparatus for recording a sequence of sync frames, indicative of data, onto tracks of an optical recording medium in which prepits are formed on lands between the tracks at intervals that are equal to an integral multiple of a unit length corresponding to a channel bit, and in which sync patterns, providing synchronization on a sync-frame basis, are inserted in the sync frames such that each sync pattern has a length in a track direction larger than a length of one of the prepits and a position of each sync pattern matches with a position of at least one of the prepits, the information recording apparatus comprising:

sync information generating means for selecting codes that represent first sync patterns for a portion of the sync frames such that each of the first sync patterns is formed as a space on the recording medium, when positions of the first sync patterns match with positions of the prepits, and for selecting codes that represent second sync patterns for the remainder of the sync frames such that each of the second sync pattern is formed on the recording medium so as to meet a low-frequency reduction scheme, when positions of the second sync patterns do not match with the positions of the prepits;

prepit position signal detecting means for detecting a prepit position signal from one of the prepits for each of the sync frames during the writing of the recording pulses to the recording medium;

write position signal generating means for generating a write-position start signal based on the prepit position signal detected by the prepit position signal detecting means; and data encoding means for generating modulation codes based on the sync frames in which the codes selected by the sync information generating means are inserted, by modulating the sync frames containing the selected codes in accordance with a predetermined modulation scheme, the data encoding means generating a sequence of recording pulses by converting the modulation codes through a predetermined conversion scheme, and the data encoding means starting outputting the sequence of recording pulses in accordance with the write-position start signal supplied by the write position signal generating means.

9. An information recording apparatus for recording a sequence of sync frames, indicative of data, onto tracks of an optical recording medium in which prepits are formed on lands between the tracks at given intervals, and in which sync patterns, providing synchronization on a sync-frame basis, are inserted in the sync frames such that each sync pattern has a length in a track direction larger than a length of one of the prepits and a position of each sync pattern matches with a position of at least one of the prepits, the information recording apparatus comprising:

sync information generating means for selecting codes that represent first sync patterns for a portion of the sync frames such that each of the first sync patterns is formed as a space, when the number of the first sync patterns being successively formed as a mark, positions of the first sync patterns matching with positions of the prepits, is larger than a predetermined number, and otherwise for selecting codes that represent second sync patterns for the remainder of the sync frames such that each of the second sync pattern is formed so as to meet a low-frequency reduction scheme;

prepit position signal detecting means for detecting a prepit position signal from one of the prepits for each of the sync frames during the writing of the recording pulses to the recording medium;

write position signal generating means for generating a write-position start signal based on the prepit position signal detected by the prepit position signal detecting means; and data encoding means for generating modulation codes based on the sync frames in which the codes selected by the sync information generating means are inserted, by modulating the sync frames containing the selected codes in accordance with a predetermined modulation scheme, the data encoding means generating a sequence of recording pulses by converting the modulation codes through a predetermined conversion scheme, and the data encoding means starting outputting the sequence of recording pulses in accordance with the write-position start signal supplied by the write position signal generating means.

10. The information recording apparatus of claim 6, wherein the prepit position signal detecting means detects a prepit position signal from a sync prepit of the prepits for one of the sync frames during the writing of the recording pulses to the recording medium, and the write position signal generating means generates a write-position start signal based on the detected prepit position signal, such that the sync pattern on the track adjacent to the land where the sync prepit is formed, the position of the sync pattern matching with the position of the sync prepit, is formed as a space on the recording medium.

11. The information recording apparatus of claim 6, wherein the write position signal generating means includes means for generating a frame sync signal, a phase of which is locked to a phase of the prepit position signal supplied by the prepit position signal detecting means, and the write position signal generating means outputs the write-position start signal in accordance with the frame sync signal.

12. The information recording apparatus of claim 9, wherein the prepit position signal detecting means detects a prepit position signal from a sync prepit of the prepits for one of the sync frames during the writing of the recording pulses to the recording medium, and the write position signal generating means generates a write-position start signal based on the detected prepit position signal, such that the sync pattern on the track adjacent to the land where the sync prepit is formed, the position of the sync pattern matching with the position of the sync prepit, is formed as a space on the recording medium.

13. The information recording apparatus of claim 7, wherein the sync information generating means includes means for selecting, when a difference between absolute values of digital sum of the selected codes for the second sync patterns is equal to zero or less than a predetermined value, the second sync pattern codes such that each second sync pattern is formed as a space on the recording medium.

\* \* \* \* \*